Sept. 7, 1937.     M. B. MORGAN     2,092,421
BRAKE DRUM
Filed Feb. 15, 1934
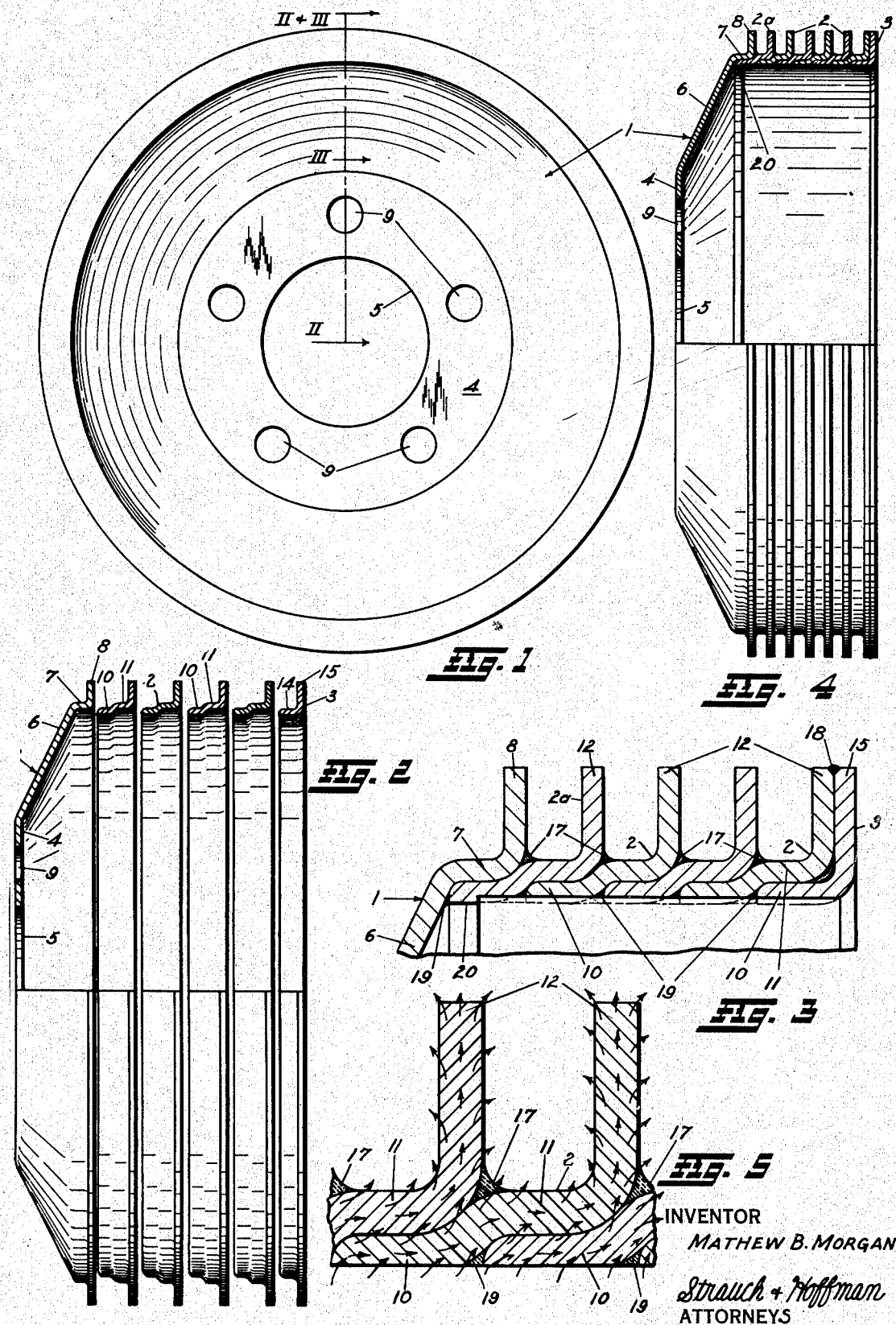
INVENTOR
MATHEW B. MORGAN
Strauch + Hoffman
ATTORNEYS Patented Sept. 7, 1937

2,092,421

UNITED STATES PATENT OFFICE 2,092,421

BRAKE DRUM

Mathew B. Morgan, Detroit, Mich., assignor to The Timken-Detroit Axle Company, Detroit, Mich., a corporation of Ohio Application February 15, 1934, Serial No. 711,415

23 Claims. (Cl. 188—218)

The present invention relates to brake drums, and more particularly it relates to brake drums for use in automotive vehicles, rail cars and the like.

At present there are two universally used types of brake drums, namely, pressed steel brake drums of one piece and cast steel brake drums. The former has its greatest usage in applications handling comparatively light loads, and the latter has its greatest usage in applications handling heavy loads.

There are objections to each of these two types. In the case of the pressed steel brake drums made from one sheet of steel, it is very difficult to obtain sufficient wall thickness around the braking surface to prevent distortion under load with a consequent eccentricity. Such eccentricity prevents 100 per cent contact with the lining member of the brake, which is necessary for efficient braking operation. A flange is ordinarily turned outwardly at the inner end of the outer periphery of such a drum in order to attempt to give it the proper resistance to going out of round. This flange only helps, and then only to a limited extent in cases where the width of the braking surface is very narrow.

However, the greatest disadvantage of the pressed steel type of drum is that there is very little surface for dissipation of the heat generated by the braking action. Due to the lack of heat dissipating or cooling surface, the metal becomes extremely hot and increases the tendency toward distortion. Another disadvantage is the initial die cost. Due to the depth of such drums it is necessary to form them in several drawing operations. The number of draws required depends on the depth. It is obvious that, should a slightly different drum be required than is already in manufacture, a new set of dies would be required.

The advantages of the pressed steel drum, which account for its present use, are small weight and low unit production cost.

Cast steel drums are ordinarily designed with a view to overcoming the disadvantages of the pressed steel drum. In order to do this, due to the comparative weakness of cast steel as compared to pressed steel, it is necessary to make the wall of the braking surface quite heavy. In addition to this heavy wall, peripheral or lateral cooling fins or ribs are usually cast on the outside thereof; thus it is necessary to employ a larger amount of metal to overcome the faults of the pressed steel brake drum. The weight of this metal is very objectionable, because it materially increases the un-sprung weight of the axle assembly with which it is associated. In some cases the cooling fins or ribs are machined in order to cut down their thickness (it is not possible to cast thin fins of substantial height), and thus cut down the weight of the drum. This procedure is also objectionable in that said machining is quite costly. A further objection to cast steel drums is their internal machining cost, for due to the inherent roughness of castings, it is necessary to do considerable machining before a finished drum having a sufficiently smooth braking surface is obtained. It is also necessary to machine the surfaces which register with like surfaces of the member to which the drum is to be attached. This last mentioned machining operation is not necessary in a pressed steel drum as the bore can be punched to size and the attaching surfaces can be made sufficiently flat.

The initial pattern cost of a cast steel drum is small as compared to the initial die cost of pressed steel drums. However, patterns are inclined to wear out more quickly than are dies so that it is often necessary to replace them. Also, for high quantity production it is advisable to have a number of patterns. It is obvious, as in the case of pressed steel drums that, should a slightly different drum be required than is already in manufacture, a new set of patterns would be required. The per piece production cost, as well as the machining, is quite high and it is only the rigidity and cooling features that lend to this type of drum its present popularity.

There are a number of modifications of the above two described types of brake drums, the foremost being a casting with a pressed steel insert at the braking surface. This type is objectionable because of its great weight and cost and its poor heat dissipating properties. Another well-known type is a pressed steel drum with an outer reenforcing band placed around the outer periphery of the braking surface with a snug fit, to prevent distortion. This type is objectionable because the heat generated on the braking surface must be transmitted through the pressed steel drum and the reenforcing band before it can be dissipated, and dissipation of the heat after it reaches the surface of the band, is slow because such bands are not ribbed.

In view of the above discussion of the various brake drums heretofore proposed it is the principal object of this invention to provide a brake drum of extreme rigidity, low weight with a maximum of cooling area, and which may be produced at low cost.

In the case of a manufacturer using a great many different sizes of brake drums, there often arises an application where a drum is required identical with a drum then in use in all respects except as to width. Heretofore it has been necessary in such cases, if a pressed steel drum is required, to make new dies, or if a cast steel drum is required, to make new patterns.

Therefore, it is a further major object of this invention to provide a drum made up of a multiplicity of identical parts, whereby the number of said identical parts may be varied to obtain brake drums of varying widths.

It is a further important object of the present invention to devise a brake drum made up of a plurality of parts that will rapidly dissipate heat generated therein.

It is a further object of my invention to devise a cylindrical brake drum having a plurality of parts, at least one of which is provided with a heat generating surface and with a heat dissipating surface exposed to the atmosphere with said surfaces integrally joined.

It is a further object of this invention to provide a brake drum made up of a number of parts, some of which are identical, said identical parts being adapted, when in their rough or semi-finished form, for use in producing brake drums of various diameters.

The foregoing and other specific objects will clearly appear from a study of the following detailed description when taken in conjunction with the claims and the accompanying drawing.

In the drawing:—

Figure 1 is a plan view looking into the open side of a preferred form of the brake drum of the present invention, Figure 2 is an elevational view of the parts of the brake drum shown in Figure 1, with the upper half thereof broken away as indicated by line II—II of Figure 1, and illustrates the parts as they appear prior to assembly and welding.

Figure 3 is an enlarged sectional view, taken on line III—III of Figure 1, and illustrates the assembled and machined drum, the configuration of the inner surface thereof being indicated by the dot and dash line.

Figure 4 is an elevational view, with the upper half thereof in section, of a modified form of brake drum also forming part of my invention.

Figure 5 is an enlarged sectional view of a portion of the brake drum.

With continued reference to the drawing, wherein like numerals designate like parts, the invention consists principally in a facing or closure 1, which is preferably, though not necessarily made of sheet metal, a multiplicity of intermediate rings 2 and 2a and a flanged end ring 3, the latter being preferably formed of sheet metal.

It will be understood that the shape of the inner portion of facing member 1 will depend upon the application to which it is to be adapted. In the form shown it is substantially cup-shaped with a flat central portion 4 which is suitably centrally apertured as at 5 to fit the pilot diameter of the member to which it is to be adapted. Closure 1 is provided with an upwardly inclined portion 6 which extends therefrom into an outer rim 7, which is cylindrical in shape and has at its outer end an upwardly extending flange 8 which is disposed substantially at right angles to the axis of closure 1. Central portion 4 of closure 1 is provided with a suitable number of approximately sized bolt holes 9 by means of which the closure may be bolted to the member to which it is to be adapted.

Each intermediate ring member 2, and also ring member 2a, is composed essentially of a cylindrical portion having a stepped construction which substantially divides it into two cylindrical portions of different diameters, such as a smaller diameter cylindrical portion 10 and a larger diameter cylindrical portion 11. The outer diameter of portion 11 of each ring member 2 is substantially equal to that of the outer surface of portion 7 of facing member 1, and has adjacent thereto an upwardly extending flange 12, which is preferably identical with flange 8 of member 1. The outside diameters of portions 10 of ring members 2 and 2a are slightly larger than the inside diameters of outer flange 7 of member 1 and portions 11 of ring members 2 and 2a. End ring 3 consists of a cylindrical portion 14 of the same size diametrically as portion 10 of rings 2 and 2a, and has an upwardly turned flange 15 at right angles thereto, which is identical with upwardly turned flanges 8 and 12 of members 1, 2 and 2a.

Intermediate ring members 2 and 2a are so dimensioned that the outside of portion 10 of any one of said members registers snugly with the inside of portion 11 of any other. As seen in Figure 3, portion 10 of ring 2a is snugly received in portion 7 of member 1, and ring members 2 are disposed in nested relationship with each other and ring member 2a, with their portions 10 disposed within portions 11 thereof. Portions 10 and 11 of ring members 2 and 2a are preferably so configured as to lie in substantially full surface engagement when they are disposed in assembled relationship for the purpose of providing a rigid structure and for facilitating heat transfer from one ring member to another.

Manufacture of the various parts is quite simple. Member 1 is made of pressed steel and due to the fact that there is comparatively little axial depth it presents no "deep drawing" manufacturing difficulties. Members 2 and 2a may be made of strips, cut to desired lengths, depending upon the diameter required, rolled in a cylindrical shape and butt-welded at their ends. If desired, however, they may be stamped in ring shape from sheet metal stock. Member 3 is made similarly to member 2. All of said members, 1, 2 and 3 are then stretched onto a mandrel or other suitable apparatus into the position shown in Figure 2 and at this stage the inner surface appears as indicated by the dot and dash lines in Figure 3. At this juncture the various parts are preferably sweated or copper-welded as indicated at 17, 18 and 19. This form of welding is preferable, for the copper flows between the contacting surfaces and results in a surface bond as compared to the restricted area bond that is produced by electric or arc-welding. It is to be understood however, that the invention is not limited to the means herein disclosed for securing the parts together, for any form of welding or other suitable means would be satisfactory.

With the drum thus formed the only machining operation necessary for its completion is then performed. This consists of machining the metal away that is indicated in Figure 3 as being disposed between the dot and dash line and the inside surface of the drum, and forms a ledge 20 on ring member 2a. This operation trues up the inside diameter of the brake drum and gives it a smooth braking surface against which the braking material is to be pressed. The amount of material to be removed by machining is comparatively small as compared to that required to be removed in a cast drum, but yet said machining compares favorably with that required for a pressed steel drum. In most cases the amount of metal removed by the machining operation will not exceed $\frac{1}{32}$ of an inch.

With reference to Figure 4, a brake drum is shown which is constructed in the same manner as that just described, but which has six ring members, and it accordingly provides a wider braking surface than the drum shown in Figures 1, 2, and 3, which is equipped with only four rings. This illustrates the ease with which a wider or narrower brake drum may be obtained by merely building up the elements of the drum as described. It will also be noted that the increments by which the drum may be narrowed or widened will depend upon the width of the members 2 and some or all of them may be made narrow if desired so as to provide smaller increments. In case it is necessary to have the braking surface at a greater or lesser distance from the brake drum supporting member, it is necessary only to change the shape of the facing member. As before noted, the cost of such a facing member is comparatively small due to the fact that a deep drawing operation is not necessary for its production. In summing up the costs, the dies required for the present invention for each diameter size of drums are, one die for forming the shape of members 2 and 2a, and one simple die for forming the shape of member 3. It will be understood that these two dies are all that is required for these members no matter what width of drum is required. Then, one die will be required for each shape of facing 1 that is to be used. It will be also understood that any width of drum can be obtained for any one shape of facing 1, by properly selecting and assembling the correct number of ring members 2 and 2a.

The above described dies are very small in number and low in cost as compared to the dies required under similar circumstances for a pressed steel drum of one piece. In the latter type drum, separate and complete dies would be required for each width of drum and for each variation in facing portions.

It must also be remembered that the thicker the metal of a pressed steel piece, the more difficult is its manufacture. If, for example, it is desired to replace a one-piece pressed steel drum having a wall thickness of $\frac{3}{8}$ of an inch with a drum embodying my invention it would only be necessary to handle $\frac{3}{16}$ thick sheets. In such a case the resulting drum would be considerably stronger than a single piece drum because of the multiplicity of radially directed flanges that the parts thereof provide.

Flanges 8, 12 and 15 serve a dual purpose; first, they lend extreme rigidity to the drum and render it highly resistant to any tendency for out-of-roundness or eccentricity and second, they present the maximum amount of area for dissipation of heat that is generated on the braking surface of the drum. The flange at the right-hand-end of the drum is preferably constructed so as to have a double thickness, as it is at this point that the first tendency toward drum eccentricity will occur.

In addition to the rigidity imparted to the structure by upstanding flanges 8, 12 and 15, the drum is also extremely strong in the vicinity of the braking surface, due to the fact that there is essentially a double thickness of metal throughout the width thereof. This not only affords added strength, but gives the drum sufficient thickness so that it will not be considerably weakened should it be necessary at any time during the life of the drum to machine out the inside diameter thereof to obtain a smooth surface because of grooves worn therein during service. Such machining in service may accordingly be done on drums incorporating this invention with less weakening effect than could be done on other pressed steel drums, which is in part due to the increased thickness and in part due to the additional strength imparted to the drum by the multiplicity of flanges.

From the foregoing it will be seen that the drum presented by this invention has all the advantages of both the single piece pressed steel drum and the cast steel drum, but at the same time has none of their disadvantages. The summed up advantages are maximum rigidity and strength and wearing qualities; high heat transmitting efficiency and maximum cooling area; and minimum cost, with special emphasis on its desirability to a manufacturer who makes drums of various sizes.

With reference to the heat dissipating operation of my invention, I have illustrated in Figure 5 an enlarged sectional view of two ring members of the drum and the conduction of heat therefrom has been indicated by arrows. In this figure no attempt has been made to indicate relative temperatures nor has any attempt been made to accurately indicate the calorific transfers involved, but it is nevertheless believed to fairly accurately depict the paths taken by the heat in escaping from the sphere of heat generation, which in the present instance, is the braking surface of the drum.

With continued reference to this figure, heat is substantially uniformly generated at the braking surface of the drum under braking conditions, and is conducted through welds 19 and cylindrical portions 10 of ring member 2 as indicated. It is observed that while a part of the heat is conducted through portions 10 thence through portions 11 and flanges 12 of rings 2 and to the atmosphere from the outer surface of portions 11, a greater part of the heat generated is conducted from portion 10 of the ring in which it is generated to portion 11 and thence to flange 12 thereof as this course does not involve the transfer of heat from one ring to another as the first course described. It is a well known fact that for bodies of equal thickness, heat will be more rapidly conducted through that one which is integrally formed, and even though a body that is made of several pieces may have the laminations thereof bonded together, heat transfer through the body is nevertheless inferior to that of an integral body. This has been objectionable in the two piece drums above mentioned that are in use today. In such drums the heat generated must be conducted through the inner or braking surfaced member, then transmitted or conveyed from the inner member to the outer drum or reenforcing member as the case may be, and thence conducted through the outer member to the atmosphere.

In my novel drum construction the heat is generated in ring members 2 and 2a, with the result that the greater part thereof may be readily conducted to the atmosphere through their integral portions 11 and flanges 12 as indicated. A part of the heat is generated in welds 19, but as copper is one of the best heat conductors known, such heat is rapidly conducted through the welds and through rings 2 to the atmosphere as indicated. Likewise welds 17 do not materially impede the dissipation of heat from the junctions of members 2 to the atmosphere.

Although I have illustrated each ring 2, and also ring 2a, as being provided with an integrally formed heat convecting and radiating flange 12, it is to be understood that if it is desired, or the conditions of the application require it, flanges 12 may be omitted from ring members 2 and 2a, and the appended claims are intended to embrace my device when it is employed in this manner. When my novel drum is utilized in the manner just described, the heat will be dissipated in a manner similar to that illustrated in Figure 5, but the heat is naturally dissipated in this instance from the outer surfaces of portions 11 of ring members 2 and 2a.

Frictional members of disc-like configuration, such as clutch plates may also be constructed in accordance with the principles of the present invention.

Although I have illustrated the braking surface of the drum as having the same diameter throughout its width, it is to be understood that if desired it may be stepped so as to provide two or more diameters to handle brake shoe assemblies of different sizes, by properly dimensioning rings 2, 2a and 3, without departing from the spirit of the present invention.

I have found by actual test that a brake drum having thirty per cent more cooling surface than another drum of substantially equal proportions can dissipate fifty per cent more heat energy for the same temperature increase.

Although I have disclosed a particular method of producing the brake drums of my invention, it is to be understood that any other suitable methods, for instance, those now employed for manufacturing conventional pressed steel drums, may be employed to produce my drums and the parts thereof without departing from the spirit of my invention.

The bond formed between rings 2, 2a and 3 and cover 1, by the welding operation has been found to be sufficient to transmit the braking torque from rings 2, 2a and 3 to the cover 1, but if desired a positive mechanical connection may be provided between the parts, of any known nature, without departing from the spirit of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake drum construction, a plurality of ring-like members secured together in axially aligned relationship, portions of at least two of said members providing an unbroken inner cylindrical braking surface, said two members having substantially equal wear coefficients.

2. The brake drum construction described in claim 1, wherein said members are of substantially equal diameter.

3. The brake drum construction described in claim 1, wherein said members are provided with integral heat dissipating portions.

4. The brake construction described in claim 1, wherein said members are provided with reenforcing, heat dissipating flanges.

5. In a brake drum construction, a plurality of sleeve members disposed in axial alignment and secured together in overlapping telescoping relationship, at least two of said sleeve members having inner cylindrical braking surfaces.

6. The construction defined in claim 5, wherein said braking surfaces are of equal diameter.

7. The construction defined in claim 5, wherein said sleeve members are provided with integrally formed heat dissipating flanges.

8. The construction defined in claim 5, wherein at least one of said braking surfaces is disposed in the region of overlap of two of said members.

9. A cylindrical frictional drum, comprising at least two members secured together in axial aligned relationship, each of said members having a frictional heat generating surface portion and a heat convecting and radiating surface portion integrally formed with said heat generating surface portion, the heat convecting and radiating surface portion of one of said members being disposed adjacent the heat generating surface portion of the other of said members.

10. In a brake drum, a supporting member; at least one drum element secured to said support, said drum element having an inner cylindrical braking surface and a heat dissipating portion; and a second drum element secured to said first named drum element and having an inner cylindrical braking surface and a heat dissipating portion, the heat dissipating portion of one of said drum elements being located adjacent the inner cylindrical braking surface of the other drum element.

11. In a brake drum, a supporting member; at least one drum element secured to said support; said drum element having an inner cylindrical braking surface and a heat dissipating portion; and a second drum element secured to said first named drum element and having an inner cylindrical braking surface of a diameter equal to that of the cylindrical surface of said first named drum element, the inner cylindrical braking surfaces of said drum elements being disposed in closely adjacent side-by-side relationship and providing an unbroken surface adapted to frictionally cooperate with a brake shoe.

12. A cylindrical brake drum or the like, comprising two members rigidly connected together for synchronous rotation, each of said members having a portion providing a heat generating surface, one of said members having a heat convecting and radiating portion integrally formed with its heat generating portion and disposed adjacent the heat generating surface of said other member.

13. The device described in claim 12, wherein the heat generating and heat convecting and radiating portions of said one member are disposed substantially normal to each other.

14. A brake drum comprising a plurality of rings of comparatively narrow axial width rigidly secured together in axially abutting relationship and providing a smooth unbroken internal surface adapted to cooperate with at least one brake shoe.

15. The brake drum described in claim 14, wherein said rings are also provided with portions which are disposed in telescoping relationship.

16. A brake drum comprising a plurality of ring members disposed in axial alignment, each of said ring members having a large diameter portion and a small diameter portion, said ring members being rigidly connected with the small diameter portion of each ring member nested in telescoping relationship to the large diameter portion of its neighboring ring member.

17. The brake drum described in claim 16, wherein the inner surfaces of said ring members define a cylindrical braking surface of constant diameter.

18. The brake drum described in claim 16, wherein the large diameter portions of at least one of said ring members terminates in a heat dissipating flange disposed substantially normal to the axis of said drum.

19. A brake drum comprising a drum support and plurality of drum-forming ring-like members disposed in axial alignment and secured to each other and to said drum in telescoping axially abutting relationship and providing a cylindrical drum having an inner braking surface, said ring-like members being of identical configuration, whereby a drum of any desired width may be built up therewith by using the requisite number of members.

20. The brake drum described in claim 19, together with a terminal ring element secured to the member remote from said drum support and providing a braking surface and an outwardly extending flange.

21. A brake drum comprising a plurality of rings of comparatively narrow axial width rigidly secured together in axially abutting relationship, said rings also having portions which are disposed in telescoping relationship.

22. A brake drum comprising a plurality of ring members disposed in axial alignment, each of said ring members having a large diameter portion and a small diameter portion, said ring members being rigidly connected with the small diameter portion of each ring member nested in telescoping relationship to the large diameter portion of its neighboring ring member, and a terminal ring member having a small diameter portion telescoped within the large diameter portion of the innermost of said ring members.

23. The brake drum described in claim 22, wherein said ring members are provided with heat dissipating flanges disposed substantially normal to the axis of said drum, and the flange of said terminal ring member is secured to the flange of one endmost ring member.

MATHEW B. MORGAN.